United States Patent Office 3,227,666
Patented Jan. 4, 1966

3,227,666
PREPARATION OF POLYURETHANE FOAMS CONTAINING AN ALUMINUM SILICATE FILLER
William E. Showalter, Seal Beach, Calif., assignor to Union Oil Company of California, Los Angeles, Calif., a corporation of California
No Drawing. Filed July 16, 1962, Ser. No. 210,234
5 Claims. (Cl. 260—2.5)

This invention relates to a method for the production of polyurethane foams having improved physical properties and to a method for incorporating inorganic fillers and extenders into urethane foams to obtain said improved properties.

Foamed or cellular polyurethanes have been prepared with a wide variety of physical properties ranging from rigid insulating materials to soft flexible cushioning materials. These materials are prepared by reacting a liquid having a reactive hydrogen, e.g., polyester or polyalkylene ether with an organic diisocyanate in the presence of a gas generating reactant. The cost of the raw materials is relatively high, although attempts have been made to substitute relatively inexpensive fatty acid glycerides, e.g., castor oil, tall oil, etc., for the reactive hydrogen liquid and to increase the volume of the product by increasing the foaming during reaction.

While these attempts have substantially reduced the cost of urethane foams, it is nevertheless desirable to incorporate inexpensive fillers or extenders into the foams to further reduce the cost of the expensive organic components. Among such materials are the relatively abundant clays and alumino silicates, e.g., kaolins, bentonites, zeolites, synthetic alumino silicates, etc. Previous investigators have incorporated various materials, e.g., organo-montmorillonites, kaolins and organo-kaolins of a specified size range into polyurethane foams and have contended that the presence of the organo-montmorillonites tends to stabilize the foam preparation and that the kaolins of a specified size range serve to extend the foam.

I have also attempted to extend the volume of foam obtained from the polyurethane reaction by the addition of various fillers, e.g., organo montmorillonites, kaolinites, etc., directly to the polyurethane reactants. In all instances, the physical properties, such as tensile and tear strengths, of the foamed urethane were impaired by the addition of the filler. Microscopic investigation of the urethane foam products indicated that although finely divided solids were employed as fillers, these materials did not disperse into the foam but existed as solid agglomerates within the foam.

I have now discovered that very stable suspension of solids in the reactive hydrogen liquid can be obtained when the finely divided solid fillers are first added to a volatile organic solvent to form a dispersion which is added to the reactive hydrogen liquid, i.e., polyester, polyalkylene ether or fatty acid glyceride, and the solvent thereafter evaporated. When these solid suspensions are used in the polyurethane formulation, foams of increased volume and improved physical properties are obtained. It is believed that the prior dispersion of the filler solids in an organic medium tends to deflocculate the solids and imparts an organophilic surface to the particles, permitting the polymeric reactant to wet the particles and thus form a complete and stable dispersion. The dispersion of filler material in the polymeric reactant is highly stable and can be stored for prolonger periods without settling. Consequently, the foam formulation is greatly simplified since the solid filler can be dispersed into the reactive hydrogen liquid component prior to its reaction with the organic diisocyanate.

In general, any organic solvent of greater volatility than the reactive hydrogen liquid can be used for the dispersing medium, i.e., with an initial atmospheric boiling point below about 200° C., and preferably below 100° C. Included in such solvents are hydrocarbons, halogenated hydrocarbons, alcohols, ketones, ethers and esters. Examples of suitable hydrocarbons are the aliphatic series such as n-pentane, isopentane, hexane, isohexane, heptane, octane, isooctane, nonane, decane, etc. Aromatic solvents can be used such as benzene, toluene, xylenes, ethylbenzene, cumene, diisopropylbenzene, etc. Halogenated hydrocarbons which can be used include the following: ethyl chloride, ethyl bromide, methylene chloride, ethylidene dichloride, acetylene dichloride, chloroform, isobutyl chloride, trichloroethane, carbon tetrachloride, n-butyl chloride, ethylene chloride, isobutyl bromide, 1,2-dichloropropane, isoamyl chloride, chlorobenzene, bromobenzene, dichlorobenzene, chloroaniline, etc. Alcohols can also be used such as methanol, ethanol, isopropanol, butanol, isoamyl alcohol, 2-methylpentanol-1, 2-ethylhexanol-2, furfural alcohol, etc. Ketones are useful such as acetone, methyl ethyl ketone, diethyl ketone, methyl butyl ketone, diisopropyl ketone, diisobutyl ketone, etc. Various other oxygenated solvents, e.g., ethers, and esters can also be employed such as diethyl ether, ethyl formate, ethyl acetate, diisopropyl ether, ethyl acetate, methyl ethyl ketone, propyl formate, ethyl propionate, diethyl ketone, butyl formate, methyl isobutyl ketone, ethyl butyrate, diisopropyl ketone, amyl acetate, ethylene glycol diisopropyl ether, ethyl, benzyl ether, methyl o-tolyl ether, etc.

The filler solids employed in my invention are ion exchange solids and comprise the synthetic and naturally occurring aluminum silicates and organophilic aluminum silicates obtained therefrom. Of the zeolitic materials are the following: chabazite, analcite, gmelinite, faujasite, molecular sieves, etc.

The preferred aluminum silicates are the naturally occurring clays which are available in a wide variety of chemical and physical properties. For the purposes of my invention, these clays can be classified into the kaolinite group and the montmorillonite groups.

The kaolinite group comprises hydrous aluminum silicates which are the chief constituents of the white clay kaolin. Included in this group are the following: anauxite, collyrite, dickite, ferrikaolinite, kaolin, kaolinite, metakaolinite, metanacrite, microvermiculite, nacrite, neokaolin, severite, etc. These aluminum silicate in general have a low base exchange capacity, generally less than about 20 milliequivalents per hundred grams. They have a non-expanding crystalline lattice and generally conform to the kaolinite structure of an $$Al_2O_3 \cdot 2SiO_2 \cdot 2H_2O$$

The montmorillonite group includes the complex clays having 3-layer crystal lattices which swell or expand in solvents. Included in this group are the following: amargosite, beidellite, bentonite, chloropal, erinite, ferromontmorillonite, hectorite, metabentonite, montmorillonite, nontronite, otaylite, saponite, etc. These clays are commonly found in admixture in bentonite clays having an average aluminum oxide content less than about 20 percent. The bentonite clays also have a high base exchange capacity, commonly between about 80 and 150 milliequivalents per 100 grams of air dried clay. These swelling or expanding lattice montmorillonite clays are found in Wyoming, South Dakota, Montana, Utah, Nevada and California.

The aforedescribed clays and natural zeolites are usually found in a form wherein the base exchange sites are occupied with alkali and/or alkaline earth metals such as sodium, calcium and magnesium. The commercial synthetic zeolites are also available with their exchange sites occupied by an alkali metal or alkaline earth metal. The clays and zeolites can be base exchanged to prepare aluminum silicates which have various other cations at the base exchange sites such as the cations of the metals of Groups I through VIII of the Periodic Table, ammonium and quaternary ammonium organic cations, the latter comprising organophilic clays.

While I have discovered that the members of the kaolinite group can be employed in the urethane preparation with their exchange sites ocupied by any of the aforementioned cations, the members of the montmorillonite group will form improved polyurethane foams only if organophilic derivatives are employed. In general, between about 2 and 50 weight percent clay based solids can be incorporated into the urethane foam; preferably between about 5 and 20 weight percent of the organic components comprises a clay based additive.

The organophilic derivatives of the aforementioned aluminum silicates solids are preferably prepared by acidification of the solid with a mineral acid-organic solvent mixture and reaction of the acidified solid with an organic amine. If desired, several stages of washing and filtration can be used to free the acidified solid of salts prior to reaction with the amine. The mineral acid, e.g., sulfuric, nitric, hydrochloric, etc., is used at a strength between about 10 and 90 percent in about 0.01 to about 4 volume ratios of acid to organic solvent. A sufficient amount of the acid-organic solvent is employed to obtain from 1 to about 10 times the stoichiometric amount of acid necessary to form the hydrogen clay, i.e., from 1 to about 10 times the base exchange capacity of the clay. In general between about 0.1 and 0.5 part of clay can be treated per part by weight of acid-solvent mixture. The acidification is preferably conducted at ambient temperatures and the solid recovered by filtration and thereafter washed several times with about 0.5 to 10 parts of fresh solvent per part by weight of clay.

Solvents which are employed in the acidification of the solid are preferably those in which alkali and alkaline earth metal salts of the treating acid are soluble in amounts greater than about 0.1 weight percent. In general, these solvents are oxygenated organic liquids and, preferably, are the mono- and polyhydric alcohols of the $C_1$-$C_5$ aliphatic hydrocarbons, e.g., methanol, ethanol, ethylene glycol, isopropanol, butanol, isopentanol, etc. The preferred treating medium comprises hydrochloric acid in methanol.

The acidified clay which has been acidified and washed sufficiently to reduce its exchangable ion and soluble salt content is thereafter reacted with an organic amine to form the desired organophilic solid. The resultant organophilic solid remains dispersed in the organic solvent after reaction and, as such, can be added directly to the reactive hydrogen polyurethane reactant. The solvent e.g., methanol, is thereafter evaporated to form the stable dispersion of organophilic solid which is used in the urethane formulation.

While the aforedescribed dispersion of the hydrogen form of kaolin clays can be used in the urethane preparation, preferably organophilic kaolins, and, of necessity, organophilic montmorillonites are prepared by reacting the hydrogen clay suspension with an organic amine. Preferably this reaction is performed in the organic solvent prior to its addition to the polyurethane reactant; however the reaction with an amine can if desired be performed with the urethane reactant dispersion or organic solvent dispersion. In general, organophilic kaolins can be obtained in this manner which have from 0.05 to about 10 weight percent chemically bonded organic matter, i.e., unextractible organic matter and organophilic montmorillonites can be prepared having from about 2 to 70 weight percent chemically bonded organic matter.

Various amines can be reacted with the acidified solid to form an organophilic solid such as the primary, secondary and tertiary amines of alkyl, alkanol, aryl, alkaryl, aralkyl, radicals having up to about 30 carbons. Examples of such amines are methyl amine, methanol amine, N-methyl ethyl amine, trimethanol amine, diethanol amine, pyridine, aniline, triethyl amine, N-methanol diisopropanol amine, p-ethyl aniline, 2-methylhexanol-2-amine, nonyl amine, N-phenyl pyrrole, dipentanol amine, diphenyl amine, N-hexyl pyrrolidine, tributyl amine, N-methyl dihexanol amine, N,N-dimethyl lauryl amine, oleyl amine, N,N'-dihexyl iminazole, recinoleyl amine, 2-phenyl lauryl amine, stearylamine, p-lauryl aniline, N-butyl ricinoleyl amine, N-lauryl pyridine, 2,6-diphenyl lauryl amine, dilauryl amine, diricinoleyl amine, etc. In general, organophilic clays so obtained comprise between about 0.05 and 15 weight percent of unextractible organic matter.

Polymeric amines and polyamines can also be employed such as the amine terminated vinyl polymers obtained by amide ion initiated polymerization of monomers such as acrylonitrile, styrene, methacrylonitrile, vinyl acetate, etc. In general, amine terminated polymers having molecular weights between about 1000 and 200,000 units can be obtained by sodamide initiated polymerization and copolymerization of the aforementioned monomers in liquid ammonia at temperatures between about $-75°$ and about 120° C. The reaction of these polymeric amines with hydrogen clays provides organophilic clays which comprise from 1 to 70 weight percent unextractible organic matter.

Polymeric polyamines obtained by the polymerization of N-vinyl amines and vinyl substituted heterocyclic nitrogen compounds such as vinyl pyridine, N-vinyl acetamide, N-vinylbenzamide, N-vinyl formamide, etc. or copolymerization of these amino monomers with other vinyl monomers such as styrene, vinyl acetates, vinyl chloride, acrylonitrile, methacrylonitrile, etc., can also be used. Examples of such polymers and copolymers are: polyvinylpyridine, polyvinylpyrrolidone, copolymer of styrene and vinyl pyridine, copolymer of vinyl chloride and vinyl pyridine, poly(N-vinyl acetamide), poly(N-vinylbenzamide), copolymer of styrene and N-vinylformamide, etc.

Amine terminated polyalkylene ethers comprise a preferred class of organic amines because they present reactive hydrogens for bonding to the polyurethane through reaction with the organic diisocyanate. These materials are prepared by condensation of alkylene oxides, e.g., ethylene oxide, propylene oxide with alkanol amines such as methanol amine, ethanol amine, isopropanol amine, etc. These condensates are available having a wide range of molecular weights from about 70 to 15,000 units. Preferably, condensates having molecular weights between about 70 and about 1000 units are used. An example of a commercially available material is H-163 marketed by Union Carbide which has four ethylene oxide units condensed with isopropanol amine and a molecular weight of 163.

The formulation of polyurethane foams is a well established art to which my invention is directly applicable. In general, the foam is formed by reacting a reactive hydrogen liquid with an organic diisocyanate in the presence of a reactant which generates a gas. A catalyst is employed to obtain the proper rate of reaction and various surface active agents are added to stabilize the foam.

The physical properties of the foamed product depend largely on the nature of the reactive hydrogen component. As previously mentioned, polyesters, polyalkylene ethers or fatty acid glycerides are commonly used for this reactant. Suitable materials have molecular weights between about 500 and 5000; preferably between about 1000 and 3000. The polyethers are essentially linear with terminal hydroxyl groups. The polyesters employed are prepared with excess glycol and accordingly have low acid numbers and moderate to high hydroxyl numbers. In general, the reactive hydrogen liquids have hydroxyl numbers between about 300 and about 20 and acid numbers (polyesters and fatty acid glycerides) less than about 10. The hydroxyl number is a direct measure of the density of reactive hydrogens and indicates the degree of cross-linking in the product. Generally, rigid foams are highly cross-linked and are prepared from components having hydroxyl numbers between about 180 and about 300. The flexible foams are obtained from components having hydroxyl numbers between about 20 and about 100, while semi-rigid foams are obtained from components having hydroxyl numbers between about 100 and 180.

The polyesters which can be employed in the foam formulation are obtained by the reaction of saturated alkyl or aryl dibasic acids or anhydrides with polyhydric alcohols in the manner well known to the art. Commercially available materials are prepared from adipic, sebacic, maleic, terephthalic, isophthalic acids and ethylene glycol, trimethylol ethane, trimethylol propane, etc.

The polyalkylene ethers useful as the reactive hydrogen liquid are obtained by polymerization of various alkylene oxides, commonly ethylene oxide or propylene oxide. Examples of such materials are mixed polyglycols of ethylene, propylene, polytetiamethylene glycol, polypropylene glycol, polyethylene glycol, etc.

Fatty acid glycerides can also be used as the reactive hydrogen liquid to yield a low cost foam. Commonly employed glycerides are castor oil, tall oil, soya oil, linseed oil, etc., which are usually admixed with up to equal amounts of low molecular weight polyols to increase the density of cross-linking sites. Among the low molecular weight polyols so used are triisopropanol, hexitols, ethylene glycol, trimethylol ethane, and polyhydric derivatives of alkylene diamines, e.g., Quadrol marketed by the Wyandotte Chemical Company which is N,N,N',N'-tetrakis(2 hydroxypropyl) ethylene diamine.

The diisocyanates employed in the urethane foam preparation are, in general, arylene diisocyanates and include the following: 2,4-tolylene diisocyanate, 2,6-tolylene diisocyanate, 3,3'-bitolylene diisocyanate, diphenylmethane, 4,4' - diisocyanate, 3,3' - dimethyl - diphenylmethane, 4,4'-diisocyanate, m-phenylene diisocyanate, 1,5-naphthalene diisocyanate, 4,4'-sulfonylbis-(phenyl isocyanate), 1 chloro-2,4-phenylene diisocyanate, 1,5-tetrahydronaphthylenediisocyanate, etc.

The amount of isocyanate employed in the formulation depends on the number of reactive hydrogens in the polyalkylene ether, polyester or fatty acid glyceride, which as previously mentioned is selected to obtain the desired degree of crosslinking. The amount of isocyanate employed is also determined by the nature of the gas generating agent and the density desired in the foamed product since the use of water as a gas generating agent consumes a stoichiometric amount of isocyanate.

Generally, when water is added to react with the diisocyanate, approximately 1 to about 10 equivalents of isocyanate; preferably between about 2 and about 6; are employed per equivalent of reactive hydrogen in the formulation. Substantially all the diisocyanate in excess of the equivalent amount consumed by the urethane formation is consumed in carbon dioxide formation with water.

In general, between about 1 and about 10 parts by weight of water are used per 100 parts by weight of urethane reactants; preferably this amount is between about 2 to 7 parts per 100 parts. As previously mentioned, diisocyanate in excess of the stoichiometric amount needed for the reactive hydrogen liquid must be used with this technique to react with the water and liberate carbon dioxide; preferably the diisocyanate is also used in a slight excess than the additional amount consumed by reaction with water.

If desired, all or a portion of the water can be replaced with a latent gas generating component, such as the halogenated hydrocarbons, e.g., trichlorofluormethane, trichlorotrifluoroethane, dichlorodifluoromethane, etc. Generally, these volatile liquids are used in amounts up to 25 weight percent of the urethane reactants, depending on desired foam density and on character of ingredient as well as ambient conditions.

To stabilize the foam, various surface active agents can be used in amounts between about 0.5 and 5.0 weight percent of the reactants. Generally non-ionic surface active agents are used, however, silicone emulsifiers can also be used, particularly with the aforementioned halogenated hydrocarbon blowing agents. Examples of suitable non-ionic surface active agents are ethylene oxide condensates of vegetable oils, alcohols, phenols, organic acids and hydroxy esters. Included in such compounds are castor oil, tall oil, linseed oil condensates of ethylene oxide having 5 to 70 weight percent of oxyethylene units. Alkylphenol polyoxyethylene compounds having one or more alkyl side chains with about 5 to 20 carbons and 5 to 70 weight percent of an oxyethylene chain can be used, e.g., ethylene oxide condensate of lauryl phenol, of 2,4-dihexyl phenol, of heptenyl cresol, of decyl resorcinol, of decenyl xylenol, etc. Ethylene oxide condensates of fatty acids having about 10 to about 25 carbons and about 5 to 70 weight percent of ethylene oxide units are also useful, e.g., condensates with lauric, stearic, oleic, linoleic, palmitic acids, etc. Ethylene oxide condensates of esterified polyhydric alcohols can also be used such as condensates of sorbitan monostearate, mannitan monolaurate, etc. having 5 to 70 weight percent of ethylene oxide units. The condensates at 5 to 70 weight percent ethylene oxide and fatty amines or amides with about 10 and 25 carbons can also be used such as the condensates of dodecanamide, tridecyl amine, hexadecyl amine, hetadecanamide, etc.

Tertiary amines and/or organic tin compounds can be used as catalysts for the reaction in the manner known to those skilled in the art. Examples of various amine catalysts are: triethylenediamine, N-alkylmorpholines, e.g., N-methylmorpholine, N-ethylmorpholine, N-butylmorpholine, trialkyl amines, e.g., trimethylamine, dibutyl ethylamine, dihexyl decylamine, etc. Examples of suitable tin compounds are tin salts of fatty acids, e.g., stannous octoate, stannous acetate, stannous propionate, stannous stearate, stannous oleate, etc. Dialkyl tin salts can also be used, e.g., dibutyl tin dilaurate, diethyl tin oleate, diisopropyl tin acetate, dihexyl tin stearate, etc. In general, the catalyst is employed in amounts between about 1 and about 12 weight percent of the urethane reactants; preferably in amounts between about 1 and 5 weight percent.

In the practice of my invention, the ion exchange solid is dispersed in the volatile organic solvent by adding the solid to the solvent with agitation. The grit and large solid particles which settle from the suspension are discarded and, preferably, the suspension is elutriated to reject all particles coarser than 5 microns and save for use all particles finer than 5 microns. The clarified and elutriated suspension is then ready for use in the polyurethane formulation, for acidification and/or base exchange with a quaternary organic ammonium cation prior to its use in the polyurethane formulation.

The suspension of kaolin, organophilic kaolin or organophilic montmorillonite is added, preferably with stirring, to the liquid reactive hydrogen component of the polyurethane reactant, i.e., the polyalkylene ether, polyester or fatty acid glyceride. Upon addition of the suspension, the admixture is heated under atmospheric or reduced pressures to evaporate the solvent. Generally temperatures from about 80° to about 250° C. are sufficient for this purpose. This solvent can be condensed and reused to prepare new solid suspensions. The solid-reactive hydrogen liquid suspension so prepared is very stable, samples exhibiting little or no phase separation after storage for several weeks to several months.

The remainder of the polyurethane preparation follows conventional practice. The one-shot technique is preferred, wherein the blowing agent (water or halogenated hydrocarbon), catalyst, and surfactant are added to the reactive hydrogen component and the resultant single blend is subsequently admixed with the organic diisocyanate to form a reacting mass which is discharged into the mold.

My invention can also be used in the "prepolymer" technique wherein the diisocyanate is aged with all or a portion of the reactive hydrogen component for several minutes to several hours prior to addition of the catalyst. In this embodiment, which is preferably used when a fatty acid glyceride is the reactive hydrogen liquid, all or a portion of the reactive hydrogen component comprises the aforedescribed solid suspension of clay or organophilic clay in reactive hydrogen reactant.

The following are illustrative of polyurethane formulations of my invention.

FORMULATION 1.—LOW DENSITY RIGID

| Component: | Parts by weight |
|---|---|
| 4,4'-diphenyl methane diisocyanate | 70 |
| Crude tall oil [1] | 75 |
| N,N,N',N'-tetrakis(2-hydroxypropyl) ethylenediamine | 25 |
| Dichlorodifluoromethane | 25 |
| Dimethyl polysiloxane | 1 |
| Triethylene diamine | 2 |

[1] A crude mixture of rosin, oleic, linoleic and stearic acids in which is suspended 10 parts by weight of an organophilic montmorillonite per 100 parts of tall oil.

FORMULATION 2.—LOW DENSITY SEMI-RIGID

| Prepolymer: [1] | Parts by weight |
|---|---|
| 2,4-tolylene diisocyanate | 100 |
| Castor oil [2] | 150 |
| Water | 5 |
| Diethyl cyclohexylamine | 5 |

[1] Prepolymer aged for 30 minutes at 75° C.
[2] A fatty acid glyceride having a hydroxyl number of 160 in which is stably dispersed 15 parts by weight of lauryl ammonium hectorite per 100 parts of castor oil.

FORMULATION 3.—HIGH DENSITY RIGID

| Prepolymer: [1] | Parts by weight |
|---|---|
| 2,4-tolylene diisocyanate | 36 |
| Soya oil [2] | 113 |
| Water | 4 |
| Diethylcyclohexylamine | 3 |

[1] Prepolymer aged for 20 minutes at 80° C.
[2] A fatty acid glyceride having a hydroxyl number of 49 in which is stably dispersed 30 parts by weight of polystyrene ammonium kaolin (average molecular weight 1000; weight percent polymer on clay 2.5) per 100 parts of soya oil.

To illustrate the results obtainable by my invention and to contrast such results with prior art suggested techniques, the following examples are presented:

EXAMPLE 1

Samples of a commercially obtainable montmorillonite, Wyoming bentonite, and kaolinite were stirred into methanol to form suspensions of about 100 grams of clay per liter of methanol. Grit and large particles of clay settled from the suspension and removed. The degritted clay suspensions were thereafter divided into several portions and one portion of each clay suspension was used directly in the urethane foam preparation.

The second portion of each clay suspension was passed upwardly through an elutriation zone to recover the finest portion having a particle size distribution between 0.01 and about 5 microns. The eleutriated fraction was again divided and one portion thereof was acidified by the addition of 10 milliliters of 38 percent hydrochloric acid per 100 grams of clay. The acidified clay was filtered from suspension and washed several times with 250 milliliters of methanol per 100 grams of clay, filtering the clay after each wash step. Each of the final suspensions of about 25 weight percent clay in methanol was thereafter divided into two fractions and an amino polyol, dioxyethylene propanol amine, was added to one fraction of each clay suspension in a sufficient quantity to achieve neutralization of the hydrogen clay. The resultant organo montmorillonite contained about 7.5 weight percent unextractable organic matter and the resultant organokaolinite contained about 0.4 weight percent unextractable organic matter.

The aforedescribed methanol suspensions of clays, fractionated clays, acidified (hydrogen) clays and organoclays were then aded to separate portions of Niax LHT-67, a polyoxypropylene triol, having a molecular weight of 2500. This product is identified in Union Carbide Chemicals Company "Technical Information Bulletin," F-40378A of April 1959, as comprising a straight polyoxypropylene adduct with hexane triol and an average hydroxyl number of 67. The methanol was removed by evaporation. To each 150 grams of the resultant polyol-clay suspensions was added:

| | Grams |
|---|---|
| Dibutyl tin dilaurate | 1.5 |
| Silicone L-520 [1] | 1.5 |
| Water (in amounts indicated below). | |

[1] A polysiloxane-polyoxyalkylene block copolymer prepared in accordance with the disclosure in U.S. Patent Number 2,834,748.

The admixtures were stirred thoroughly in a high speed mixer and thereafter 49 grams of tolylene diisocyanate was added, the mixtures were stirred for an additional 20 seconds, and then poured into molds. After five minutes at room temperature the resultant foams were placed in an oven at 150° F. for four hours, removed, visually inspected and tested. The following table summarizes the results.

Table 1

| Sample No. | Clay Description | Clay Grams | Water, Grams | Density lbs./cu. ft. | Tensile, p.s.i. | Tear Resistance lbs./in. | Remarks |
|---|---|---|---|---|---|---|---|
| 1 | Degritted kaolinite | 17.6 | 3 | 2.78 | 22.0 | 2.7 | |
| 2 | Fractionated kaolinite | 17.6 | 3 | 2.79 | 23.4 | 2.4 | |
| 3 | Acidified, degritted kaolinite | 17.6 | 3 | 2.70 | 25.0 | 2.2 | |
| 4 | Acidified, fractionated kaolinite | 17.6 | 3 | 2.76 | 25.6 | 2.8 | |
| 5 | do | 17.6 | 4 | 2.34 | 24.0 | 3.2 | |
| 6 | do | 17.6 | 5 | 1.98 | 24.0 | 2.9 | |
| 7 | Dioxyethylene propanol ammonium kaolinite | 17.6 | 3 | 2.86 | 22.0 | 1.9 | |
| 8 | do | 17.6 | 4 | 2.33 | 27.2 | 2.1 | |
| 9 | do | 17.6 | 5 | 2.12 | 21.5 | 1.6 | 2 ml. of trichlorofluoromethane was added to increase foaming. |
| 10 | do | 17.6 | 5 | 1.91 | 21.0 | 1.7 | |
| 11 | Degritted montmorillonite | 17.6 | 3 | 2.97 | 11.6 | 0.7 | Not a stable suspension. |
| 12 | Fractionated montmorillonite | 17.6 | 3 | | | | Foam collapsed. |
| 13 | Acidified fractionated montmorillonite | 17.6 | 3 | | | | Do. |
| 14 | Dioxyethylene propanol ammonium montmorillonite | 17.6 | 3 | 3.56 | 25.2 | 2.3 | |
| 15 | do | 8.8 | 3 | 2.91 | 24.8 | 2.0 | |
| 16 | do | 4.4 | 3 | 2.69 | 20.0 | 2.0 | |
| 17 | do | 17.6 | 3 | 3.30 | 25.6 | 2.5 | |
| 18 | do | 17.6 | 3.5 | 3.03 | 25.6 | 2.7 | |
| 19 | do | 17.6 | 4.0 | 3.17 | 20.8 | 2.8 | |
| 20 | do | 17.6 | 4.5 | 2.50 | 20.8 | 2.3 | |
| 21 | do | 17.6 | 5.0 | 2.24 | 19.5 | 2.1 | |
| | Polyurethane foam having no fillers | 0 | 3.0 | 2.8 | 20.3 | 1.7 | |

EXAMPLE 2

The following example illustrates the results obtained by adding a powdered clay solid directly to the polyol of a urethane as heretofore practiced by the prior art. Also added to the polyol were 3 milliliters of water, 1.5 grams of a silicon surfactant and 1.5 grams of dibutyl tin dilaurate catalyst. The polyol suspension was thereafter mixed thoroughly with a high speed stirrer and, where indicated, milled in a ball mill or heated prior to addition of the tolylene diisocyanate. The amounts of polyol and diisocyanate employed are set forth in the following table which summarizes the results.

The degritted kaolin employed in this example was obtained by suspending kaolin in 95 volumes of water, and the hydrogen kaolin was obtained by passing an aqueous suspension of the degritted kaolin through a column of an ammonium charged ion exchange cation resin, a hydroxyl charged anion exchange resin and finally a hydrogen charged cation exchange resin. A portion of the aqueous suspension was thereafter spray dried to obtain a powdered hydrogen clay solid. To other portions of the hydrogen kaolin and to portions of hydrogen montmorillonite obtained in a similar manner were added various organic amines in amounts sufficient to neutralize the hydrogen clays. The resultant organoclay suspensions were then spray dried to obtain a powdered solid which was added to the polyol system. The following table describes the types of organoclays investigated and results so obtained.

Table 2

| Sample No. | Clay Description | Clay Grams | TDI Grams | Polyol Grams | Density lbs/cu. ft. | Tensile, p.s.i. | Tear resistance, lbs./in. | Remarks |
|---|---|---|---|---|---|---|---|---|
| 22 | Kaolin | 37 | 45 | 113 | 2.78 | 22.4 | 2.2 | Poor texture of foam. |
| 23 | Degritted kaolin | 37 | 45 | 113 | 2.91 | 21.6 | 2.3 | Do. |
| 24 | Hydrogen kaolin | 34 | 55 | 143 | 2.63 | 18.4 | 2.7 | |
| 25 | do | 33 | 55 | 142 | 2.70 | 20.0 | 2.7 | Milled into polyol; poor texture of foam. |
| 26 | Monoethanol ammonium kaolin | 38 | 45 | 113 | 3.08 | 17.6 | 2.3 | Poor texture of foam. |
| 27 | do | 38 | 49 | 150 | 3.02 | 20.8 | 1.6 | Heated in polyol to 170° F. for one hour. |
| 28 | Calcium kaolin | 10.5 | 49 | 150 | 2.86 | 20.0 | 2.3 | |
| 29 | Polyvinylsilicone ammonium kaolinite | 10.5 | 49 | 150 | 2.91 | 20.0 | 2.1 | |
| 30 | Polyvinylsilicone ammonium montmorillonite | 10.5 | 49 | 150 | 2.74 | 18.4 | 2.3 | |
| 31 | 4-vinylpyridine montmorillonite | 10.5 | 49 | 150 | 2.90 | 20.0 | 2.0 | |
| 32 | Ammonium montmorillonite | 10.5 | 49 | 150 | 2.94 | 16.0 | 2.0 | |
| 33 | Powdered silica "Cab-O-Sil" | 6 | 49 | 150 | 3.31 | 19.2 | 2.8 | |
| 34 | Dioxyethylene propanol ammonium montmorillonite | 22.2 | 49 | 150 | 3.27 | 19.2 | 1.8 | |
| 35 | do | 35.3 | 49 | 150 | 3.26 | 19.8 | 1.8 | |
| 36 | do | 50 | 49 | 150 | 3.43 | 17.2 | 1.9 | |
| 37 | do | 66.6 | 49 | 150 | 3.69 | 17.6 | 2.0 | |
| 38 | Tetraethanol ammonium montmorillonite | 10.5 | 49 | 150 | 2.80 | 20.8 | 2.0 | |
| 39 | do | 35.3 | 49 | 150 | 3.03 | 19.2 | 1.9 | |
| 40 | do | 66.6 | 49 | 150 | 3.57 | 14.8 | 1.8 | |
| 41 | Monoethanol ammonium montmorillonite | 10.5 | 49 | 150 | 2.76 | 19.2 | 1.6 | |
| 42 | do | 35.3 | 49 | 150 | 3.28 | 18.2 | 2.3 | |
| 43 | do | 66.6 | 49 | 150 | 3.56 | 16.8 | 1.7 | |
| 44 | Hydrogen montmorillonite | 10.5 | 49 | 150 | 3.10 | 18.2 | | |
| 45 | do | 35.3 | 49 | 150 | 3.05 | 17.4 | 2.1 | |
| 46 | do | 66.6 | 49 | 150 | 3.41 | 13.2 | 1.8 | |
| 47 | Montmorillonite | 10.5 | 49 | 150 | 2.41 | 26.7 | 1.7 | |
| 48 | do | 35.3 | 49 | 150 | 3.05 | 20.5 | 2.2 | |
| 49 | do | 66.6 | 49 | 150 | 3.40 | 18.6 | 1.6 | |
| 50 | Polyvinyl alcohol montmorillonite adduct | 10.5 | 49 | 150 | 3.10 | 22.1 | 2.0 | |
| 51 | do | 35.3 | 49 | 150 | 2.98 | 19.4 | 2.1 | |
| 52 | do | 66.6 | 49 | 150 | 3.24 | 17.8 | 2.0 | |
| | Polyurethane foam without fillers | 0 | 49 | 150 | 2.8 | 20.3 | 1.7 | |

A comparison of the tensile and tear strengths of samples 1 through 6 (Table 1) to the properties of the unfilled foam and to the properties of samples 22 through 25 (Table 2) will show that my preparation of urethane foam results in:

(1) Clay filled foams having tensile and tear strengths greater than unfilled foams;

(2) Clay filled foams which can be extended to a lower bulk density than unfilled foams without impairing the tensile and tear strength of the foam; and (3) Clay filled foams which have greater tensile and tear strengths than obtained by prior art suggested techniques of adding the clay filler.

A comparison of results from samples 24 and 25 indicates that attempts to mill the clay into the polyol did not improve the foam properties. Samples 7 through 10 illustrate the results obtainable with organokaolin clays, which substantially duplicate the results of the inorganic kaolin filled clays, samples 1 through 6.

Samples 11 through 14 illustrate the failure of urethane foams which occurs when inorganic montmorillonite clays are used as fillers. I have found that this behavior can be avoided by base exchanging an organic amine onto the clay in an amount greater than about one weight percent and the samples 14 through 21 demonstrate results obtainable with such organophilic montmorillonites. From this data it can be seen that foams of reduced density can be obtained with substantially no reduction in tensile strength compared to the unfilled foam.

The remaining data in Table 2 illustrates that foams of improved tensile and tear strengths can not be obtained from clays or organoclays by adding the dry clay powder directly to the polyol used in the urethane formulation.

The preceding data are presented solely to illustrate my preparation of urethane foams and are not to be construed as unduly limiting of my invention which is defined by the following claimed sequence of method steps and equivalents thereof.

I claim:

1. In the preparation of cellular polyurethanes wherein a reactive hydrogen liquid having a molecular weight between about 500 and 3,000, a hydroxyl number between about 20 and about 300 and selected from the class consisting of polyalkylene ethers, fatty acid glycerides, polyesters of dibasic acids and dihydric alcohols having acid numbers less than about 10, and mixtures thereof, is reacted with an excess of an arylene diisocyanate in the presence of a blowing agent, a catalyst and a surface active agent; the improved method of incorporating an aluminum silicate solid filler within said cellular polyurethane which comprises forming a suspension of said aluminum silicate solid in a volatile organic liquid having a boiling point lower than said reactive hydrogen liquid, admixing said suspension with said reactive hydrogen liquid, removing said volatile organic liquid by evaporation and thereafter admixing and reacting said reactive hydrogen liquid with said arylene diisocyanate.

2. The method of claim 1 wherein said aluminum silicate solid is a clay selected from the class consisting of kaolin, orgnophilic kaolin and organophilic montmorillonite.

3. The method of claim 1 wherein the amount of said clay comprises between about 2 and about 20 weight percent of the total weight of the organic polyurethane reactants.

4. The method of claim 2 wherein said aluminum silicate is an organophilic kaolin and is prepared by (1) suspending kaolin in an acidification medium comprising a mixture of hydrochloric acid in methanol to convert the kaolin to hydrogen kaolin, (2) filtering the resultant hydrogen kaolin from the acidification medium, (3) suspension of the filtered hydrogen kaolin solid in said volatile organic liquid, and (4) addition of an organic amine to the suspension of said hydrogen kaolin in an amount sufficient to neutralize said hydrogen kaolin and form said organophilic kaolin having between about 0.05 and 10 weight percent of chemically bonded organic matter.

5. The method of claim 2 wherein said aluminum silicate is an organomontmorillonite and is prepared by (1) suspending montmorillonite in an acidification medium comprising a mixture of hydrochloric acid in methanol to convert said montmorillonite to hydrogen montmorillonite, (2) filtering said hydrogen montmorillonite from said acidification medium, (3) suspension of the filtered hydrogen montmorillonite solid in said volatile organic liquid, and (4) addition of an organic amine to the suspension of said hydrogen montmorillonite in an amount sufficient to neutralize said hydrogen montmorillonite and form said organophilic montmorillonite having between about 2 and about 70 weight percent of chemically bonded organic matter.

References Cited by the Examiner

UNITED STATES PATENTS

| | | | |
|---|---|---|---|
| 3,015,634 | 2/1962 | Ferrigno | 260—2.5 |
| 3,024,209 | 3/1962 | Ferrigno | 260—2.5 |
| 3,029,209 | 4/1962 | Ferrigno | 260—2.5 |

FOREIGN PATENTS

| | | |
|---|---|---|
| 158,769 | 9/1962 | Australia. |

LEON J. BERCOVITZ, *Primary Examiner.*